United States Patent [19]
Bonn

[11] Patent Number: 6,134,893
[45] Date of Patent: Oct. 24, 2000

[54] SWIVEL BAYONET JOINT FOR CRYOGENIC FLUIDS

[75] Inventor: John W. Bonn, Hilliard, Ohio

[73] Assignee: Chart Inc., Mayfield Heights, Ohio

[21] Appl. No.: 09/284,142

[22] PCT Filed: Oct. 8, 1997

[86] PCT No.: PCT/US97/18208

§ 371 Date: Apr. 7, 1999

§ 102(e) Date: Apr. 7, 1999

[87] PCT Pub. No.: WO98/15772

PCT Pub. Date: Apr. 16, 1998

Related U.S. Application Data

[60] Provisional application No. 60/027,970, Oct. 8, 1996.

[51] Int. Cl.[7] .................................................... F17C 13/00
[52] U.S. Cl. ................................ 62/50.7; 285/47; 285/904
[58] Field of Search ........................... 62/50.1, 50.7; 285/47, 904

[56] References Cited

U.S. PATENT DOCUMENTS

| | | | |
|---|---|---|---|
| 3,946,572 | 3/1976 | Bragg | 62/50.1 |
| 3,962,882 | 6/1976 | Gee et al. | 62/50.1 |
| 4,011,732 | 3/1977 | Doherty et al. | 62/50.7 |
| 4,107,946 | 8/1978 | Potter | 62/50.7 |
| 5,195,325 | 3/1993 | Short et al. | 62/50.7 |

*Primary Examiner*—Ronald Caposesela
*Attorney, Agent, or Firm*—Richard P. Crowley

[57] ABSTRACT

A method and system for dispensing cryogenic fluids, such as liquified natural gas (LNG), using a swivel bayonet joint interconnecting first and second sections of cryogenic pipe. The swivel bayonet joint includes a male bayonet joint and a corresponding female bayonet joint. An insertion stem of the male bayonet joint is dimensioned to have a very high tolerance fit within the receiving sleeve of the female joint that extends a sufficient length for formation of a vapor trap by the cryogenic fluid between the insertion end of the stem and the clamp end of the receiving sleeve. The vapor trap prohibits movement beyond the vapor trap of any cryogenic fluid passing through the joint, consequently, elastomeric seals in the bayonet joint remain insulated from extremely cold temperatures of the cryogenic fluid.

17 Claims, 4 Drawing Sheets

SWIVEL BAYONET JOINT FOR CRYOGENIC FLUIDS

CROSS REFERENCE TO RELATED APPLICATIONS

This Application claims the benefit of U.S. Provisional application Ser. No. 60/027,970, filed on Oct. 8, 1996.

BACKGROUND OF THE INVENTION

The present invention relates to apparatus for transferring cryogenic fluids such as liquid oxygen or liquified natural gas (LNG), and especially relates to a cryogenic fluid dispensing system and method for transferring the cryogenic fluid to a vehicle through fixed and flexible cryogenic pipes.

It is well known that transferring stored cryogenic fluids from storage tanks to a point of utilization of the fluid requires specialized apparatus because such cryogenic fluids as liquified oxygen, hydrogen, nitrogen, argon or LNG must be stored and maintained at extremely low temperatures. For example, LNG is normally stored at temperatures of between −240° Fahrenheit (F.) to −200° F. (about −150° Celsius (C.) to −130° C.). It is hoped that LNG will someday become an economical, clean and abundant fuel to power conventional vehicles such as trucks and automobiles. Some governments (e.g., California) have already implemented legislation to require a phase-in of use of LNG for such purposes in the near future.

Efficient and safe storage, distribution and use of LNG poses many technical problems inherent to processing such low temperature fluids. For example, pipes transferring LNG from typically underground storage tanks must be insulated to restrict heat input to the fluid from the environment. Most such cryogenic pipes utilize an inner line for transferring the fluid, and an outer jacket surrounding and co-axial with the inner line wherein a static vacuum is established within an elongate annular space between the inner line and outer jacket to limit heat input by conduction or convection. The space is typically also filled with an insulating substance such as aluminized mylar with alternating layers of glass paper or an equivalent in order to restrict heat input by radiation. It is also common to use cryogenic bayonet joints or connections to join sections of cryogenic pipe together in a field environment to minimize heat loss at such a connection. Known bayonet connections utilize a male insertion joint and a corresponding female receiving joint surrounding and co-axial with vacuum insulated inner lines to minimize heat input at the connection. An extremely close fit between the corresponding male and female joints defines a very thin annular cavity between the joints and the cryogenic fluid forms a vapor trap in the annular cavity to prevent loss of the fluid, and to restrict heat input through the joint. Known bayonet joints thereby provide an efficient structure for joining sections of cryogenic pipe in a field environment without any need for welding the pipes or any need for producing or reestablishing a static vacuum in the pipes. However, such bayonet joints are only for fixed sections of cryogenic pipes because the joints do not enable the sections of cryogenic pipe to rotate or swivel relative to each other.

To dispense fuel to a vehicle, a cryogenic fuel dispensing arm must be able to readily extend from a pump control housing to a dispensing position having a discharge outlet adjacent the vehicle and then move safely back to the control housing into a stored position. For such a cryogenic fuel dispensing arm to perform efficiently such a task, it must include one or more joints that permit swiveling of pipe sections relative to each other.

Typical non-cryogenic swivel joints, however, involve mechanical components such as bearing races and seals that are in close proximity to the process fluids passing through the joint. If the fluids were to be at temperatures common to cryogenic fluids, standard elastomeric seals would become brittle and could fail, and common bearing lubricants could not be used. Moreover, rapid temperature fluctuations of mechanical components of the joint that are metal when the components transition from ambient temperatures to extremely cold temperatures could cause contraction and cracking of such components, and subsequent leakage. Additionally, even if specialty metals, and cold temperature seals and lubricants were used, traditional swivel joints would still remain a source of heat input to the cryogenic fluid, and thereby decrease overall efficiency of an LNG dispensing station using such a swivel joint. No known swivel joint for a fluid transferring or conducting system is able to both effectively restrict heat input into the fluid and also maintain mechanical components of the joint at ambient temperatures while a cryogenic process fluid passes through the joint.

Accordingly it is a general object of the present invention to provide a swivel bayonet joint for cryogenic fluids that overcomes the deficiencies of the prior art.

It is more specific object to provide a swivel bayonet joint for cryogenic fluids that enables hardware components of the joint to remain at ambient temperatures while a cryogenic fluid passes through the joint.

It is another specific object to provide a swivel bayonet joint for cryogenic fluids that can be readily assembled in a field environment.

It is yet a further object to provide a swivel bayonet joint for cryogenic fluids that enables sections of cryogenic pipe connected by the joint to swivel while the cryogenic fluid passes through the joint.

The above and other advantages of this invention will become more readily apparent when the following description is read in conjunction with the accompanying drawings.

SUMMARY OF THE INVENTION

This invention relates to a swivel bayonet joint, system and method for transferring cryogenic fluids such as liquified oxygen, hydrogen, nitrogen, argon or liquified natural gas (LNG), and especially relates to a cryogenic fluid dispensing system employing a swivel bayonet joint.

The swivel bayonet joint of the cryogenic fluid dispensing system facilitates transfer of a cryogenic fluid from a first section of cryogenic pipe to a second section of cryogenic pipe. The swivel bayonet joint includes a male bayonet joint and a corresponding female bayonet joint. In a particular embodiment, the male bayonet joint includes: an insertion stem having an insertion jacket surrounding and co-axial with a male inner line and secured to the male inner line at an insertion end of the stem; and, a first swivel clamp means secured to the insertion jacket adjacent a clamp end of the stem. The female bayonet joint includes: an outer jacket surrounding and coaxial with a receiving sleeve, a line end of the receiving sleeve being secured to a female inner line surrounded by and co-axial with the outer jacket; and, a second swivel clamp means secured adjacent a clamp end of the receiving sleeve. The insertion stem of the male bayonet joint is dimensioned to have a diameter slightly smaller than a diameter of the receiving sleeve and the insertion stem is dimensioned to have a first axial length from the clamp end to the insertion end that is slightly shorter than a second axial length from the line end to the clamp end of the receiving sleeve so that the insertion stem establishes a very high tolerance fit within the receiving sleeve.

The very high tolerance fit between the insertion stem and receiving sleeve extends along the first axial length, which is a length sufficient for formation of a vapor trap by the cryogenic fluid between the insertion end of the stem and the clamp end of the receiving sleeve. The vapor trap prohibits movement beyond the vapor trap of any cryogenic fluid passing through the joint, thereby prohibiting contact between the cryogenic fluid and the female and male clamp ends of the female and male bayonet joints. Consequently a primary advantage of the swivel bayonet joint is that mechanical components of the swivel clamp means such as elastomeric seals remain insulated from extremely cold temperatures of the cryogenic fluid and therefore the mechanical components may be fabricated of standard materials and lubricated with standard lubricants which would not work if exposed to cryogenic temperatures.

The first and second swivel clamp means are for securing the male and female bayonet joints together in a swivel relationship, so that the joints may swivel in relation to each other about an axis parallel to flow of the cryogenic fluid through the male and female inner lines. In alternative embodiments, the first clamp means is a first bearing race and the second clamp means is a second bearing race for securing at least one ball bearing between the first and second bearing races; the first axial length between the clamp end and insertion end of the insertion stem is at least three times as long as a third length being a diameter of the male inner line; the second axial length between the line end and the clamp end of the receiving sleeve is at least three times as long as a fourth length being a diameter of the female inner line; a male annular cavity defined between the male inner line and the insertion jacket is a static vacuum; and a female annular cavity defined between the outer jacket and receiving sleeve is a static vacuum.

The invention includes a method of transferring cryogenic fluids through first and second sections of cryogenic pipe that swivel in relation to each other comprising the steps of: securing a male bayonet joint to the first section having an insertion stem with an insertion jacket surrounding and co-axial with a male inner line and secured to the male inner line at an insertion end of the stem and having a first swivel clamp secured to the insertion stem adjacent a clamp end of the stem; securing a female bayonet joint to the second section of cryogenic pipe having an outer jacket surrounding and co-axial with a receiving sleeve, a line end of the receiving sleeve being secured to a female inner line surrounded by and coaxial with the outer jacket, and having a second swivel clamp secured adjacent a clamp end of the receiving sleeve; inserting the insertion stem of the male bayonet joint into the receiving sleeve of the female bayonet joint; clamping the first and second swivel clamps together; and, forming a vapor trap between the insertion stem and receiving sleeve at a position between the insertion end of the stem and the clamp end of the receiving sleeve while passing the cryogenic fluid through the first and second sections so that the cryogenic fluid remains away from and does not cool the first and second swivel clamps.

In a preferred embodiment the swivel bayonet joint is employed in a cryogenic fluid dispensing system including a pump control housing transferring cryogenic fluid into and out of a cryogenic storage tank; and at least one swivel bayonet joint interconnecting first and second sections of a cryogenic pipe of a fuel dispensing arm secured to the housing to facilitate the fuel dispensing arm in moving from a stored position to a dispensing position.

DETAILED DESCRIPTION OF THE PREFERRED EMBODIMENTS

Figure 1:
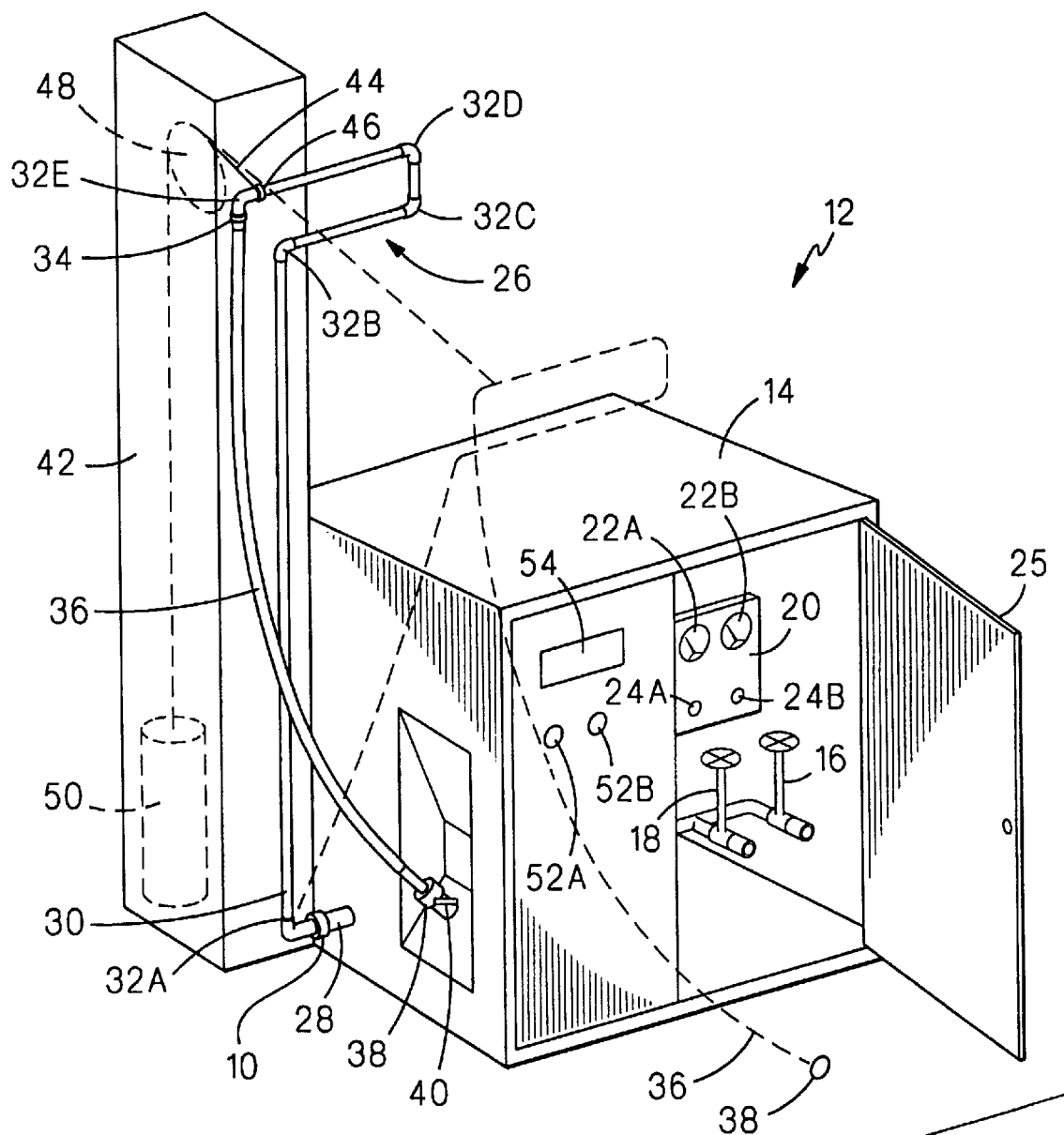
FIG. 1 is a schematic representation of a cryogenic fluid dispensing system including a swivel bayonet joint constructed in accordance with the present invention.
Figure 2:
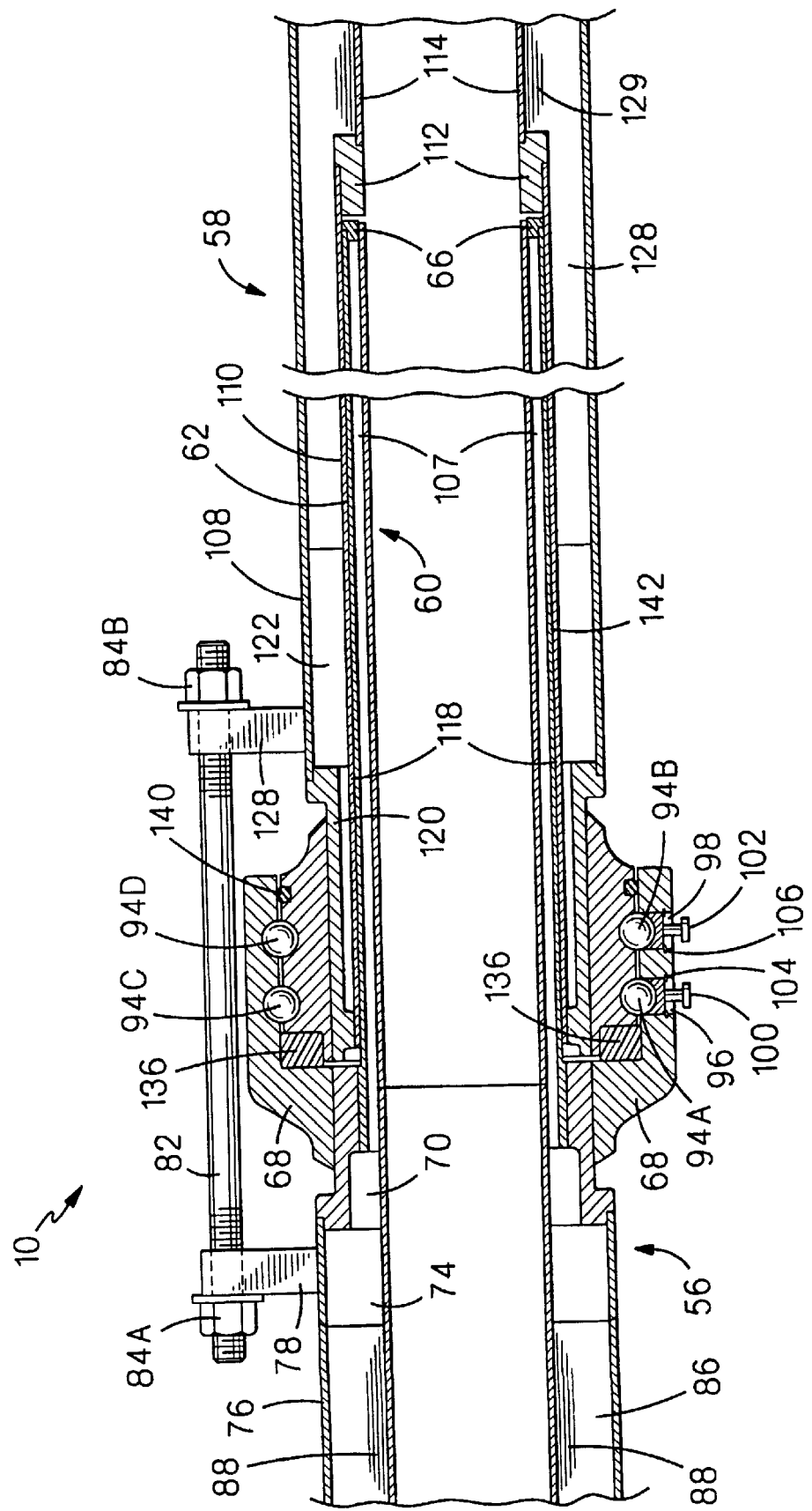
FIG. 2 is a cross-sectional view of a swivel bayonet joint of the present invention.

Referring to the drawings in detail, a swivel bayonet joint of the present invention is best shown in FIG. 2 and generally designated by the reference numeral 10. The swivel bayonet 10 joint may be employed in a cryogenic fluid dispensing station or system 12 (shown schematically in FIG. 1), wherein a pump control housing 14 protects a cryogenic fluid fixed inlet valve 16 and fixed outlet valve 18 for directing cryogenic fluids to a storage tank (not shown), which is typically located underground. The housing 14 houses a control panel 20 having standard gages 22A, 22B and switches 24A, 24B for controlling inlet and outlet of the fluid through the fixed inlet and outlet valves 16, 18, which are protected by a housing door 25. A cryogenic fluid dispensing arm 26 is secured to the housing 14 at a housing cryogenic outlet pipe 28. The arm 26 includes a swivel bayonet joint 10 interconnecting the outlet pipe 28 and a second section of cryogenic pipe 30; a plurality of right angle cryogenic pipe joints 32A, 32B, 32C, 32D, 32E; a second swivel bayonet joint 34 secured between the second and a third section of cryogenic pipe 36; and a discharge outlet 38 secured to a distal end of the third section of pipe 36 for dispensing cryogenic fluid into a cryogenic fluid user such as a vehicle (not shown).

In FIG. 1, the discharge outlet 38 is shown in solid lines in a stored position wherein the outlet is secured to an arm inlet 40 of the pump control housing 14, and is shown in broken lines in a dispensing position wherein the discharge outlet 38 is moved away from the housing 14 toward a possible loading position of a vehicle on a roadway 41. In the dispensing position, the third section of cryogenic pipe 36 has swiveled or rotated within the second swivel bayonet joint 34 to facilitate positioning of the discharge outlet 38, and the second section of cryogenic pipe 30 has rotated in the first swivel bayonet joint 10. It is noted that standard cryogenic pipe may be rigid or flexible and swivel bayonet joints constructed in accordance with the present invention may be utilized in both rigid or flexible cryogenic pipes. In the example of a cryogenic fluid dispensing system 12 shown in FIG. 1, usage of two swivel bayonet joints 10 and 34 demonstrates how rigid cryogenic pipes may facilitate the fluid dispensing arm in achieving a substantial range of motion in moving from the stored to the dispensing positions. The cryogenic fluid dispensing system 12 may include counter weight means for compensating for the weight of the fluid dispensing arm 26 as it moves from the stored position to the dispensing position, such as a counter weight stack 42. The stack 42 includes a cable 44 secured to an upper balance point 46 of the second section of cryogenic pipe 30 that passes over a pulley wheel 48 rotatably secured within the stack 42 and attaches to a counter weight 50. The counter weight moves up and down within he stack as the arm 26 moves to counter the weight of the arm 26. The pump control housing 14 could also include standard dispensing control switches 52A, 52B and a dispensing gage 54 to control transfer of the cryogenic fluid through the fluid dispensing arm 26.

Figure 3:
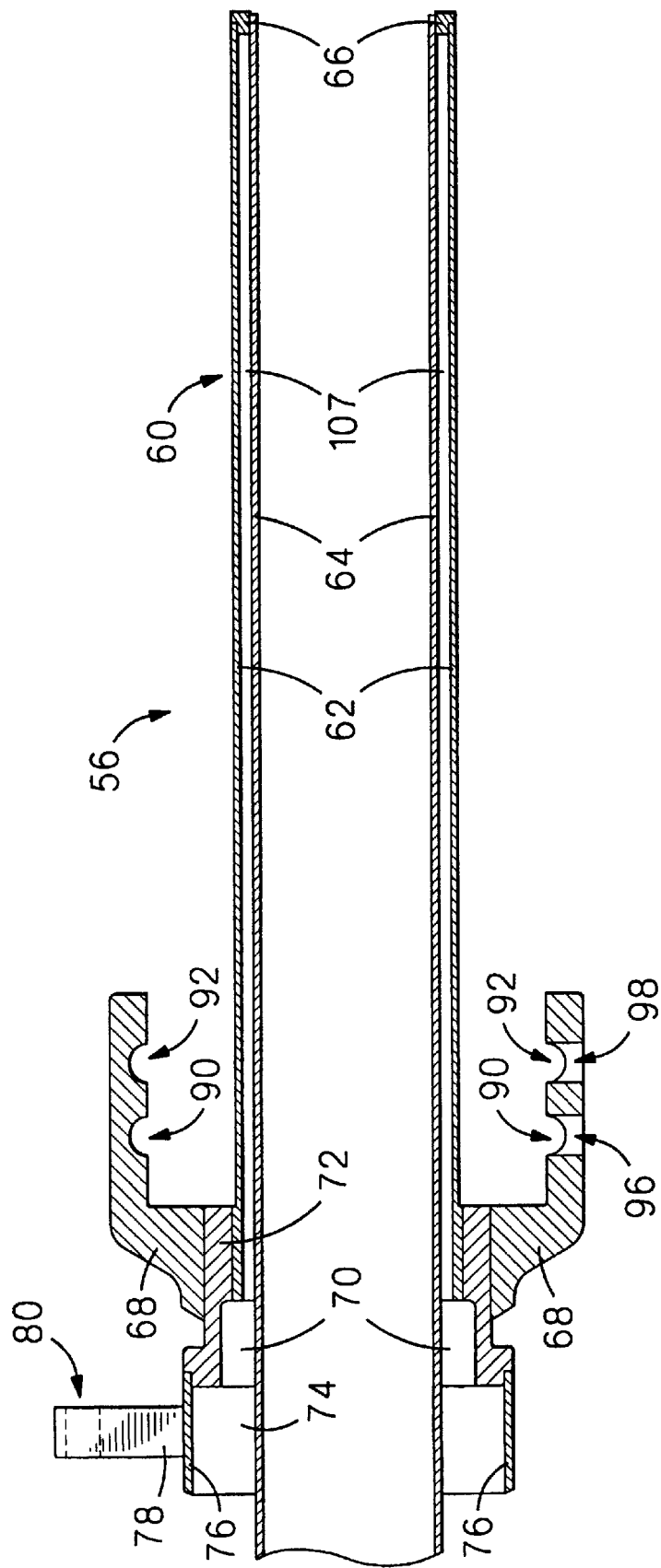
FIG. 3 is a cross-sectional view of a male bayonet joint of the FIG. 2 swivel bayonet joint.

The swivel bayonet joint 10 is best shown in cross section in FIG. 2, and includes a male bayonet joint 56 and a female bayonet joint 58. In FIG. 3, the male bayonet joint 56 is shown separated from the corresponding female bayonet joint 58. The male bayonet joint 56 includes an insertion stem 60 having an insertion jacket 62 surrounding and co-axial with a male inner line 64 and secured to the male inner line 64 at an insertion end 66 of the stem 60. A first swivel clamp means for securing the male bayonet joint 56 to the female bayonet joint 58 may include any of a variety of known clamp or grasping apparatus for cylindrical devices that permit rotation of the devices such as an outer bearing race 68. The outer race 68 is secured to and co-axial with the insertion jacket 62 adjacent a clamp end 70 of the insertion stem 60, and is secured to first clamp mount block 72 affixed to the insertion jacket 62. The first clamp mount block may be of a dissimilar material to that of the outer race 68 to provide heat insulation from extremely cold cryogenic fluid passing through the male inner line 64.

The male bayonet joint also includes a first support strut 74 that supports a pipe jacket 76 co-axial with the male inner line 64. A first tightening post 78 is secured to the pipe jacket 76 defining a first tightening throughbore 80 that receives a tightening rod 82 (shown in FIG. 2) secured by first and second tightening nuts 84A, 84B. An annular pipe cavity 86 is defined between the male inner line 64 and the pipe jacket 76 and a static vacuum is established within the cavity for insulation against heat input by conduction or convection into the male inner line 64 from outside the jacket 76, and the cavity 86 may also include a radiation insulating substance 88 such as aluminized mylar or glass paper for insulation against heat input by radiation into the male inner line 64. The outer bearing race 68 defines first and second annular bearing slots 90, 92 for housing one or more ball bearing sets 94A, 94B, 94C, 94D (shown in FIG. 2), and first and second access holes 96, 98 are defined in the outer bearing race 68, and are dimensioned for entry and exit of at least one of the ball bearings. First and second bearing plugs 100, 102 sit in the access holes 96, 98 to secure the ball bearing sets within the slots 90, 92, and first and second plug snap rings 104, 106 secure the plugs within the access holes 96, 98. A male annular cavity 107 is defined between the insertion jacket 62 and male inner line 64 which may have a static vacuum and aluminized mylar or similar radiation insulation materials for insulating cryogenic fluids passing through the male inner line 64 from heat input through the insertion stem 60.

Figure 4:
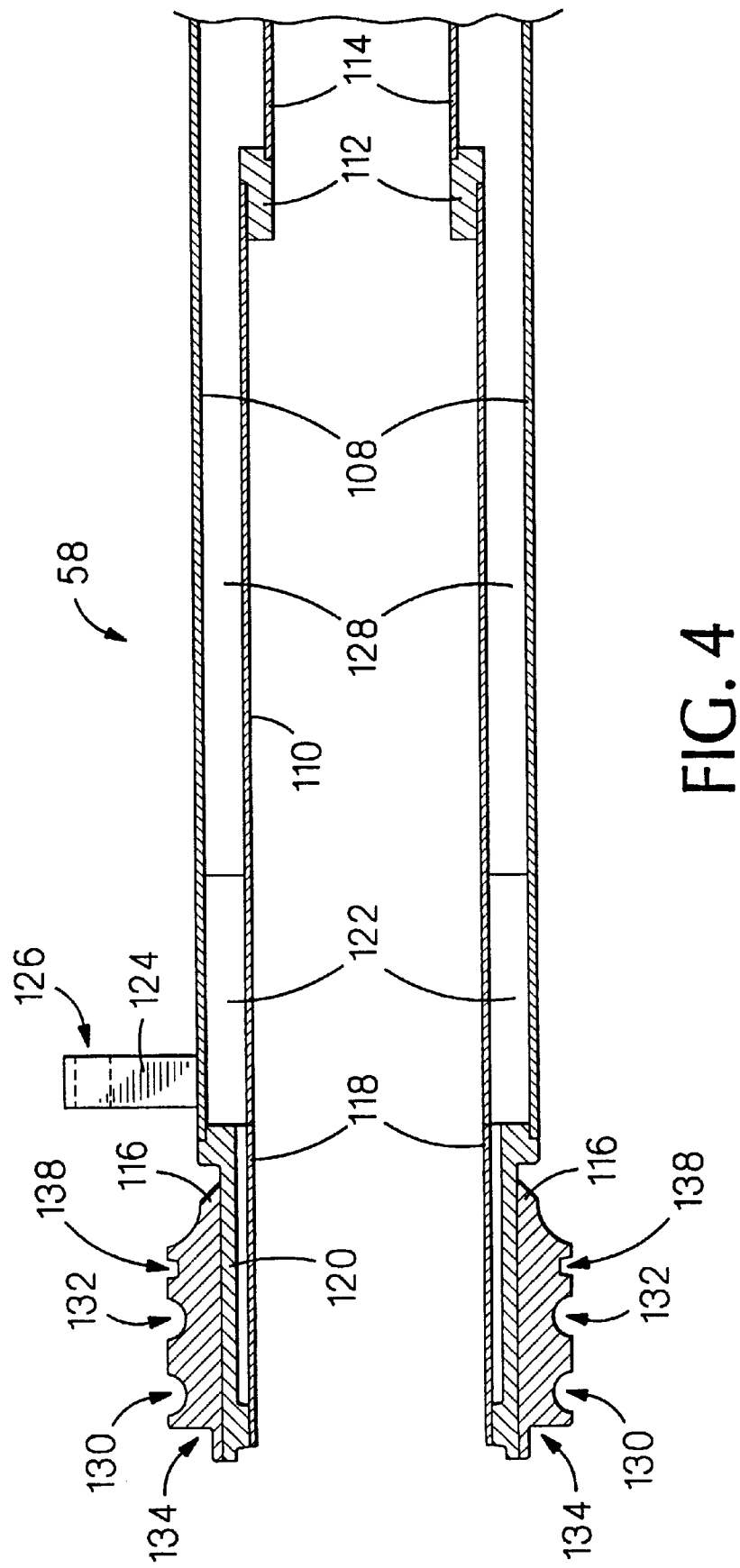
FIG. 4 is a cross-sectional view of a female bayonet joint of the FIG. 2 swivel bayonet joint.

As best seen in FIGS. 2 and 4, the female bayonet joint 58 includes an outer jacket 108 surrounding and coaxial with a receiving sleeve 110. A line end 112 of the receiving sleeve 110 is secured to a female inner line 114 surrounded by and co-axial with the outer jacket 108. A second clamp means for clamping the female bayonet joint to the male bayonet joint may include any of a variety of known clamp or grasping apparatus for cylindrical devices that permit rotation of the devices such as an inner bearing race 116. The inner bearing race 116 is secured to and co-axial with the receiving sleeve 110 adjacent a clamp end 118 of the receiving sleeve 110, and is secured to a second clamp mount block 120 affixed to the receiving sleeve 110. The second clamp mount block 120 may be of a dissimilar material to that of the inner race 116 to provide heat insulation from extremely cold cryogenic fluids passing through the male inner line 64. As best seen in FIG. 4, the clamp end 118 of the receiving sleeve 110 includes that portion of the sleeve 110 under the second clamp mount block 120.

The female bayonet joint 58 also includes a second support strut 122 that supports the outer jacket 108. A second tightening post 124 is secured to the outer jacket 108 defining a second tightening throughbore 126 that receives the tightening rod 82 for securing the male and female bayonet joints 56, 58 together. It is noted that the tightening rod 82 is removed after the male and female joints are secured together and the first and second swivel clamp means are properly assembled so that the joints may rotate or swivel in relation to each other. A female annular cavity 128 is defined between the outer jacket 108 and the female inner line 114 and receiving sleeve 110 and a static vacuum is established within the cavity as with the annular pipe cavity 86 and male annular cavity 107 for insulation against heat input by conduction or convection from outside the outer jacket 108. The female annular cavity 128 may also be insulated against heat input by radiation by layers of aluminized mylar 129 or other standard, thin radiation insulation materials.

The inner bearing race 116 defines third and fourth annular bearing slots 130, 132 dimensioned to correspond with the first and second bearing slots 90, 92 of the outer bearing race 68 so that at least one set of ball bearings 94A, 94B, 94C, 94D may be housed within the first, second, third and fourth annular bearing slots 90, 92, 130, 132. The inner bearing race 116 also defines a first seal cavity 134 for housing a first seal 136 (shown in FIG. 2). A second seal cavity 138 is also defined in the inner race 116 for housing a second seal 140 (shown in FIG. 2). The first and second seal cavities 134, 138 may house seal means for protecting the ball bearing sets and associated lubricants from contaminants that would impede optimum performance of the outer and inner bearing races 68, 116 and enclosed ball bearing sets in allowing the male and female bayonet joints 56, 58 to swivel or rotate relative to each other about an axis parallel to flow of cryogenic fluids through the male and female inner pipes 64, 114. The seal means may include standard elastomer "O" ring types of seals made of well-known materials such as Viton, Buna-N Nitrile, Rubber, etc. For purposes of clarity, the outer race 68, inner race 116, ball bearing sets 94A, 94B, 94C, 94D, and seal means such as the first and second seals 136, 140 will be referred to as mechanical components of the swivel bayonet joint 10 because they facilitate movement of the male and female bayonet joints 56, 58 relative to each other.

In use of the swivel bayonet joint 10 of the present invention a shop fabricated pipe spool of cryogenic pipe (not shown) will normally have male bayonet joint 56 at one end and a female bayonet joint 58 at an opposed other end. In a field usage such as connecting a second section of pipe 30 of a cryogenic fluid dispensing arm to a third section of pipe 36, the first and second seals 136, 140 are seated in their respective first and second seal cavities 134, 138 on the inner race 116 of the female joint 58. Next, the insertion stem 60 of the male bayonet joint 56 is inserted into the receiving sleeve 110 of the female bayonet joint 58 and the tightening rod 82 is inserted between the first and second tightening posts 78, 124 and tightened by first and second tightening nuts 84A, 84B. The ball bearing sets 94A, 94B, 94C, 94D are then inserted through the bearing access holes 96, 98 into the corresponding bearing slots 90, 92, 130, 132 of the inner and outer races, appropriate lubrication is applied to the bearing slots, and the bearings are then secured within the slots by the first and second bearing plugs 100, 102 and their first and second seals 104, 106. The tightening rod 82 is then removed, and the male and female bayonet joints 56, 58 are free to rotate relative to each other.

When a cryogenic fluid passes through the female inner line 114 and male inner line 64, some of the fluid will move between the insertion end 66 of the insertion stem 60 and the line end 112 of the receiving sleeve 110 and into an interface 142 between the insertion stem 60 and the receiving sleeve 110. As best shown in FIG. 2, the insertion stem 60 is dimensioned to have an outer diameter slightly smaller than an inner diameter of the receiving sleeve 110, and the insertion stem is dimensioned to have a first axial length from its clamp end 70 to its insertion end 66 that is slightly shorter than a second axial length of the receiving sleeve from its clamp end 118 to its line end 112 so that the a very high tolerance fit is established between the insertion stem 60 and receiving sleeve 110. The very high tolerance fit between the insertion stem 60 and receiving sleeve 110 extends along the first axial length which is a length sufficient for formation of a vapor trap by the cryogenic fluid along the first axial length of the insertion stem 60 between its insertion end 66 and the clamp end 118 of the receiving sleeve 110.

The vapor trap prohibits movement of the cryogenic fluid beyond the trap and thereby prohibits contact between the fluid and clamp ends of the male and female bayonet joints 56, 58. Consequently, a primary advantage of the swivel bayonet joint 10 is that the mechanical components of the swivel clamp means such as the inner and outer bearing races 68, 116, first and second seals 136, 140, ball bearing sets 94A, 94B, 94c, 94D and associated lubricants remain at ambient temperatures, insulated from the extremely cold temperatures of the cryogenic fluids, and hence the mechanical components may be manufactured of standard materials and lubricated with standard lubricants that would ordinarily not function at cryogenic temperatures. It is pointed out that very high tolerance fits between insertion stems and receiving sleeves of known bayonet joints that do not swivel are capable of producing vapor traps for restricting movement of cryogenic fluid passing through the joint into contact with exterior surfaces of the joint, such as the "BJ-Series Bayonet Connections" and the "LJ-Series Bayonet Connections" manufactured and sold by CVI Cryogenic Vacuum Equipment, of Columbus, Ohio, U.S.A.

Testing of prototype swivel bayonet joints constructed in accordance with the present invention have demonstrated that an optimum first axial length between the insertion end 66 and clamp end 70 of the insertion stem 60 is at least three times as long as a third length being a diameter of the male inner line 64, and that an optimal length of the second axial length between the line end 112 and clamp end 118 of the receiving sleeve is at least three times as long as a fourth length being a diameter of the female inner line 114.

The swivel bayonet joint 11 may be fabricated of standard materials used to manufacture cryogenic bayonet joints such as those referred to above as "BJ-Series Bayonet Connections" and the "LJ-Series Bayonet Connections" manufactured and sold by CVI Cryogenic Vacuum Equipment, of Columbus, Ohio, U.S.A., and the mechanical components of the joint 11 may likewise be fabricated of standard materials for non-cryogenic pipe swivel joints.

While the present invention has been described and illustrated with respect to a particular construction of a swivel bayonet joint, system and method for transferring cryogenic fluids, it will be understood by those skilled in the art that the present invention is not limited to this particular example. Accordingly, reference should be made primarily to the attached claims rather than the foregoing description to determine the scope of the invention.

What is claimed is:

1. A swivel bayonet joint for transferring cryogenic fluids, comprising:

a. a male bayonet joint including an insertion stem having an insertion jacket surrounding and co-axial with a male inner line and secured to the male inner line at an insertion end of the stem, and a first swivel clamp means secured to the insertion jacket adjacent a clamp end of the stem; and b. a female bayonet joint including an outer jacket surrounding and co-axial with a receiving sleeve, a line end of the receiving sleeve being secured to a female inner line surrounded by and co-axial with the outer jacket, and a second swivel clamp means secured adjacent a clamp end of the receiving sleeve for clamping to the first swivel clamp means to secure the male and female bayonet joints together in a swivel relationship, so that the joints may swivel in relation to each other about an axis parallel to flow of the cryogenic fluid through the male and female inner lines, wherein the insertion stem is dimensioned to establish a high tolerance fit within the receiving sleeve along a first axial length from the clamp end to the insertion end of the stem, the first axial length being a length sufficient for formation of a vapor trap of cryogenic fluid along the first axial length between its insertion end and the clamp end of the receiving sleeve, so that the cryogenic fluid cannot move beyond the vapor trap to cool mechanical components of the first and second clamp means.

2. The swivel bayonet joint of claim 1, wherein the first clamp means and second clamp means comprise corresponding outer and inner bearing races defining a bearing slot housing at least one set of bearings, and defining seal cavities housing seal means for protecting the set of bearings from contaminants.

3. The swivel bayonet joint of claim 1, wherein a male annular cavity is defined between the insertion jacket and the male inner line and the male annular cavity is maintained at a static vacuum enclosing at least one layer of radiation insulation material.

4. The swivel bayonet joint of claim 1, wherein a female annular cavity is defined between the outer jacket and receiving sleeve and the female annular cavity is maintained at a static vacuum enclosing at least one layer of radiation insulation material.

5. The swivel bayonet joint of claim 1, wherein the first axial length of the insertion stem between the insertion end and clamp end of the stem is at least three times a length of a diameter of the male inner line and a second axial length of the receiving sleeve between the line end and clamp end of the sleeve is at least three times a length of a diameter of the female inner line.

6. The swivel bayonet joint of claim 1, wherein the first clamp means includes a first tightening post and the second clamp means includes a second tightening post, the first and second tightening posts having a tightening rod removably secured between the posts.

7. A cryogenic fluid dispensing system for transferring a cryogenic fluid from a storage tank to a fluid user, comprising:

a. a pump control housing for housing control switches for conducting the cryogenic fluid out of the storage tank; and, b. A cryogenic fluid dispensing arm secured to a housing cryogenic outlet pipe of the pump control housing, the arm including a swivel bayonet joint interconnecting a first section and a second section of cryogenic pipe for facilitating movement of the arm from a storage position to a dispensing position, and a discharge outlet secured to a distal end of the section of cryogenic pipe farthest from the housing for dispensing the cryogenic fluid into the fluid user, the swivel bayonet joint including;

i. a male bayonet joint including an insertion stem having an insertion jacket surrounding and co-axial with a male inner line and secured to the male inner line at an insertion end of the stem, and a first swivel clamp means secured to the insertion jacket adjacent a clamp end of the stem; and ii. a female bayonet joint including an outer jacket surrounding and co-axial with a receiving sleeve, a line end of the receiving sleeve being secured to a female inner line surrounded by and co-axial with the outer jacket, and a second swivel clamp means secured adjacent a clamp end of the receiving sleeve for clamping to the first swivel clamp means to secure the male and female bayonet joints together in a swivel relationship, so that the joints may swivel in relation to each other about an axis parallel to flow of the cryogenic fluid through the male and female inner lines, wherein the insertion stem is dimensioned to establish a high tolerance fit within the receiving sleeve along a first axial length from the clamp end to the insertion end of the stem, the first axial length being a length sufficient for formation of a vapor trap of cryogenic fluid along the first axial length between its insertion end and the clamp end of the receiving sleeve, so that the cryogenic fluid cannot move beyond the vapor trap to cool mechanical components of the first and second clamp means.

8. The cryogenic fluid dispensing system of claim 7 further comprising counter weight means for compensating for weight of the fluid dispensing arm as the arm moves from the storage position to the dispensing position.

9. The cryogenic fluid dispensing system of claim 8, wherein the counter weight means comprises a counter weight stack including a cable secured to an upper balance point on the fluid dispensing arm, the cable passing over a pulley wheel rotatably secured within the stack and attaching to a counter weight below the wheel so that the weight moves up and down as the arm moves between the storage and dispensing positions to counter the weight of the arm.

10. The cryogenic fluid dispensing system of claim 9, wherein the first clamp means and second clamp means comprise corresponding outer and inner bearing races defining a bearing slot housing at least one set of bearings, and defining seal cavities housing seal means for protecting the set of bearings from contaminants.

11. The cryogenic fluid dispensing system of claim 10, wherein a male annular cavity is defined between the insertion jacket and the male inner line and the male annular cavity is maintained at a static vacuum enclosing at least one layer of radiation insulation material.

12. The cryogenic fluid dispensing system of claim 11, wherein a female annular cavity is defined between the outer jacket and receiving sleeve and the female annular cavity is maintained at a static vacuum enclosing at least one layer of radiation insulation material.

13. The cryogenic fluid dispensing system of claim 12, wherein the first axial length of the insertion stem between the insertion end and clamp end of the stem is at least three times a length of a diameter of the male inner line and a second axial length of the receiving sleeve between the line end and clamp end of the sleeve is at least three times a length of a diameter of the female inner line.

14. The cryogenic fluid dispensing system of claim 13, wherein the first clamp means includes a first tightening post and the second clamp means includes a second tightening post, the first and second tightening posts having a tightening rod removably secured between the posts.

15. A method of transferring cryogenic fluid through first and second sections of cryogenic pipe that swivel in relation to each other, comprising the steps of:

a. securing a male bayonet joint to the first section of cryogenic pipe, the male bayonet joint having an insertion stem with and insertion jacket surrounding and co-axial with a male inner line and secured to the male inner line at an insertion end of the stem and having a first swivel clamp secured to the insertion stem adjacent a clamp end of the stem;

b. securing a female bayonet joint to the second section of cryogenic pipe, the female bayonet joint having an outer jacket surrounding and coaxial with a receiving sleeve, a line end of the receiving sleeve secured to a female inner line surrounded by and co-axial with the outer jacket, and a second swivel clamp secured adjacent a clamp end of the receiving sleeve;

c. inserting the insertion stem of the male bayonet joint into the receiving sleeve of the female bayonet joint;

d. clamping the first and second swivel clamps together so that the first and second sections of cryogenic pipe swivel in relation to each other about an axis parallel to flow of cryogenic fluid through the sections; and e. forming a vapor trap of cryogenic fluid between the insertion stem and the receiving sleeve at a position between the insertion end of the insertion stem and the clamp end of the receiving sleeve so that the vapor trap stops movement of the cryogenic fluid beyond the vapor trap and the cryogenic fluid cannot cool mechanical components of the first and second swivel clamps.

16. The method of claim 15, wherein the step of clamping the first and second swivel clamps together includes inserting at least one set of ball bearings into bearing slots defined within the clamps, and removably securing the ball bearings within the slots.

17. The method of claim 15 wherein the steps of securing the male and female bayonet joints to the first and second sections of cryogenic pipe include establishing a static vacuum in a male annular cavity defined between the insertion jacket and male inner line, and establishing a static vacuum in a female annular cavity defined between the outer jacket and female inner line.

\* \* \* \* \*